United States Patent
Hyun et al.

(10) Patent No.: US 6,221,115 B1
(45) Date of Patent: Apr. 24, 2001

(54) CANDLE WAX STABILIZED BY A COMBINATION OF UV ABSORBER PLUS A SELECTED HINDERED AMINE

(75) Inventors: James Lee Hyun; Walid Al-Akhdar, both of Danbury, CT (US); Kevin Trainor, Brewster, NY (US); Ramanathan Ravichandran, Nanuet, NY (US); Mervin Wood, Poughquag, NY (US); Andrea Smith, Wingdale, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/495,495

(22) Filed: Feb. 1, 2000

(51) Int. Cl.[7] ........................................ C11C 5/00
(52) U.S. Cl. ............................. 44/275; 431/288
(58) Field of Search ................. 44/275; 431/288

(56) References Cited

U.S. PATENT DOCUMENTS

| | | | |
|---|---|---|---|
| 5,773,091 | * 6/1998 | Perlman et al. | 427/384 |
| 5,879,694 | 3/1999 | Morrison et al. | 424/405 |
| 5,964,905 | 10/1999 | Camp et al. | 44/275 |

FOREIGN PATENT DOCUMENTS

| | | |
|---|---|---|
| 0005922 | 12/1979 | (EP) . |
| 0133964 | 3/1985 | (EP) . |
| 0359488 | 3/1990 | (EP) . |
| 94/13736 | 6/1994 | (WO) . |

OTHER PUBLICATIONS

F.A. Ballentine et al, Inhibiting Color Fading of Dyed Candles with CYASORB® Light Absorbers, Cytec Industries Date unknown.

R. van der Vennet, Antioxidants in Wax–Replacement of BHT, National Candle Association Technical Committee, Oct., 1994.

Ullmann's Encyclopedia of Industrial Chemistry, vol. A5, Candles, pp. 29–30 Date unknown.

* cited by examiner

Primary Examiner—Margaret Medley
Assistant Examiner—Cephia D. Toomer
(74) Attorney, Agent, or Firm—Luther A. R. Hall

(57) ABSTRACT

Candle wax containing a combination of a UV absorber, preferably a benzotriazole, in combination with a hindered amine which is substituted on the N-atom by an alkoxy, a cycloalkoxy or an hydroxy-substituted alkoxy moiety is surprising better stabilized than candle wax which contains a combination of a UV absorber and a conventional hindered amine where the N-atom is substituted by hydrogen or alkyl.

21 Claims, No Drawings

CANDLE WAX STABILIZED BY A COMBINATION OF UV ABSORBER PLUS A SELECTED HINDERED AMINE

The instant invention pertains to compositions containing candle wax stabilized by a combination of a UV absorber, preferably a benzotriazole, plus a hindered amine substituted on the N-atom by an alkoxy, a cycloalkoxy or a hydroxy-substituted alkoxy moiety.

BACKGROUND OF THE INVENTION

Candles have been known for many centuries going back to the eighth century B.C. The nature of candles is described in Ullmann's Encyclopedia of Industrial Chemistry, Volume A5 at pages 29–30 where it is seen that candles are made from paraffin, beeswax and stearin as basic materials, and where a host of additives may also be present.

It is not surprising that with candles and wax becoming increasingly more important attention was paid as to how to stabilize said materials. At the National Candle Association Meeting in Houston, 1994, R. van der Vennet presented a paper on "Antioxidants in Wax—Replacement of BHT" touting the use of Vitamin E (tocopherol) as an antioxidant to prevent the yellowing of wax when oxidized. WO 94/13736 describes the same invention.

EP 359,488 A3 and EP 133,964 B 1 describe stabilized waxes used in cosmetics where the waxes are the same or similar to those used in candles.

EP 5,922 A1 describes lip cosmetics where the waxes are useful in lipsticks and are related to those useful in candles.

U.S. Pat. No. 5,879,694 describes in detail transparent gel candles both in composition and structure. The use of BHT as an antioxidant is mentioned.

At the National Candle Association Technical Meeting on Apr. 16, 1998, F. A. Ballentine et al., presented a paper entitled "Inhibiting Color Fading of Dyed Candles with CYASORB® Light Absorbers" in which the general theories of thermal oxidation and photodegradation are discussed along with data on the effect of light absorbers on color stability of dyed candle waxes. The light absorbers compared are 4-octyloxy-2-hydroxy-benzophenone UV-531; 4-methoxy-2-hydroxybenzophenone UV-9; 2-(2-hydroxy-5-methylphenyl)-2H-benzotriazole UV-5365; 2-(2-hydroxy-5-tert-octylphenyl-2H-benzo-triazole UV-5411 and 2-(2-hydroxy-3,5-di-tert-amylphenyl)-2H-benzotriazole UV-2337).

U.S. Pat. No. 5,964,905 teaches dyed and scented candle gels containing triblock copolymers and a hydrocarbon oil of high flash point. This reference teaches that a light (UV) absorber may be used to improve the shelf stability of the candle color when exposed to visible or ultraviolet light. Two preferred absorbers are ethylhexyl p-methoxycinnamate (PARSOL® MCX, Roche) and 2-(2-hydroxy-5-tert-octylphenyl)-2H-benzotriazole (CYASORB® 5411, Cytec).

OBJECTS OF THE INVENTION

One object of the invention is to provide for a white, dyed, dipped, unscented and/or scented candle wax stabilized by a UV absorber plus a hindered amine substituted on the N-atom by an alkoxy, a cycloalkoxy or a hydroxy-substituted alkoxy group.

DETAILED DISCLOSURE

The instant invention pertains to a composition which comprises (a) white, dyed, dipped, unscented and/or scented candle wax, and (b) an effective stabilizing amount of a combination of
  (i) a UV absorber, and
  (ii) a hindered amine substituted on the N-atom with an alkoxy, cycloalkoxy or a hydroxy-substituted alkoxy group or a mixture of said hindered amines, wherein the ratio by weight of (i) to (ii) is from 10:1 to 1:10; preferably 4:1 to 1:4; most preferably 2:1 to 1:2.

An effective amount of the UV absorber plus the hindered amine in the candle wax is 0.01 to 10% by weight, preferably 0.1 to 2% by weight; and most preferably 0.1 to 0.5% Iby weight based on the wax.

Preferably the UV absorber of component (i) is a benzotriazole, a benzophenone, an α-cyanoacrylate, an oxanilide, an s-triazine, a cinnamate, a malonate, a benzoate or a salicylate, or a mixture thereof.

Most preferably the UV absorber of component (i) is a benzotriazole, a benzophenone or an s-triazine; especially a benzotriazole.

The UV absorbers are well known in the field of stabilization of substrates from degradation caused by exposure to actinic radiation. Examples of UV absorbers which may be used beneficially in candles include the following:

(a) 4-octyloxy-2-hydroxybenzophenone;

(b) 4-methoxy-2-hydroxybenzophenone;

(c) 2-(2-hydroxy-5-methylphenyl)-2H-benzotriazole;

(d) 2-(2-hydroxy-5-tertloctylphenyl-2H-benzotriazole;

(e) 2-(2-hydroxy-3,5-di-tert-amylphenyl)-2H-benzotriazole;

(f) octyl 3-(benzotriazol-2-yl)-5-tert-butyl-4-hydroxyhydrocinnamate;

(g) 2-(2-hydroxy-3,5-di-tert-butylphenyl)-2H-benzotriazole;

(h) 2-(2-hydroxy-5-tert-butylphenyl)-2H-benzotriazole;

(i) 5-chloro-2-(2-hydroxy-3,5-di-tert-butylphenyl)-2H-benzotriazole;

(j) 5-chloro-2-(2-hydroxy-3-tert-butyl-5-methylphenyl)-2H-benzotriazole;

(k) 2-(2-hydroxy-3-sec-butyl-5-tert-butylphenyl)-2H-benzotriazole;

(l) 2-(2-hydroxy-4-octyloxyphenyl)-2H-benzotriazole;

(m) 2-(2-hydroxy-3-dodecyl-5-methylphenyl)-2H-benzotriazole;

(n) 2-[2-hydroxy-3,5-di(α,α-dimethylbenzyl)phenyl]-2H-benzotriazole;

(o) 2-[2-hydroxy-3-(α,α-dimethylbenzyl)-5-tert-octylphenyl]-2H-benzotriazole;

(p) 2-{2-hydroxy-3-tert-butyl-5-[2-(omega-hydroxy-octa (ethyleneoxy)carbonyl)-ethyl]phenyl}-2H-benzotriazole;

(q) 2-{2-hydroxy-3-tert-butyl-5-[2-(octyloxy)carbonyl) ethyl]phenyl}-2H-benzoriazole;

(r) 2-ethylhexyl p-methoxycinnamate;

(s) 4-methoxy-2,2'-dihydroxybenzophenone;

(t) 4,4'dimethoxy-2,2'-dihydroxybenzophenone;

(u) 2,4-bis(2,4-dimethylphenyl)-6-(2-hydroxy-4-octyloxyphenyl)-s-triazine;

(v) 2,4-diphenyl-6-(2-hydroxy-4-hexyloxyphenyl)-s-triazine;

(w) 2,4-bis(2,4-dimethylphenyl)-6-[2-hydroxy-4-(3-do-/tri-decyloxy-2-hydroxypropoxy)phenyl]-s-triazine; and (x) 2,4-bis(2,4-dimethylphenyl)-6-[2-hydroxy-4-(3-do-/tri-decyloxy-2-hydroxypropoxy)-5-α-cumylphenyl]-s-triazine.

Preferably, the UV absorber is (a) 4-octyloxy-2-hydroxybenzophenone;

(b) 4-methoxy-2-hydroxybenzophenone;

(d) 2-(2-hydroxy-5-tert-octylphenyl-2H-benzotriazole;

(o) 2-[2-hydroxy-3-(α,α-dimethylbenzyl)-5-tert-octylphenyl]-2H-benzotriazole;

(p) 2-{2-hydroxy-3-tert-butyl-5-[2-(omega-hydroxy-octa(ethyleneoxy)carbonyl)-ethyl]phenyl}-2H-benzotriazole; or (q) 2-{2-hydroxy-3-tert-butyl-5-[2-(octyloxy)carbonyl)ethyl]phenyl}-2H-benzotriazole.

The hindered amines substituted on the N-atom by an alkoxy or a cycloalkoxy moiety are well known in the art. These are described in detail in U.S. Pat. No. 5,204,473, the relevant parts of which are incorporated herein by reference.

The hindered amines substituted on the N-atom by an alkoxy, cycloalkoxy or benzyloxy moiety which are useful in the instant invention include the following:

(a) bis(1-octyloxy-2,2,6,6-tetramethylpiperidin-4-yl) sebacate;

(b) bis(1-cyclohexyloxy-2,2,6,6-tetramethylpiperidin-4-yl) sebacate;

(c) 1-cyclohexyloxy-2,2,6,6-tetramethyl-4-octadecylaminopiperidine;

(d) 2,4-bis[(1-cyclohexyloxy-2,2,6,6-tetramethylpiperidin-4-yl)butylamino]-6-(2-hydroxyethylamino-s-triazine;

(e) bis(1-cyclohexyloxy-2,2,6,6-tetramethylpiperidin-4-yl) adipate;

(f) the oligomeric compound which is the condensation product of 4,4'-hexamethylenebis(amino-2,2,6,6-tetramethylpiperidine) and 2,4-dichloro-6-[(1-octyloxy-2,2,6,6-tetramethylpiperidin-4-yl)butylamino]-s-triazine end-capped with 2-chloro-4,6-bis(dibutylamino)-s-triazine;

(g) the oligomeric compound which is the condensation product of 4,4'-hexamethylenebis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine;

(h) 1-methoxy-4-hydroxy-2,2,6,6-tetramethylpiperidine;

(i) 1-octyloxy-4-hydroxy-2,2,6,6-tetramethylpiperidine;

(j) 1-cyclohexyldxy-4-hydroxy-2,2,6,6-tetramethylpiperidine;

(k) 1-methoxy-4-oxo -2,2,6,6-tetramethylpiperidine;

(l) 1-octyloxy-4-oxo-2,2,6,6-tetramethylpiperidine;

(m) 1-cyclohexyloxy-4-oxo-2,2,6,6-tetramethylpiperidine, (n) bis(1-heptyloxy-2,2,6,6-tetramethylpiperidin-4-yl) sebacate, (o) bis(1-nonyloxy-2,2,6,6-tetramethylpiperidin-4-yl) sebacate, (p) bis(1-dodecyloxy-2,2,6,6-tetramethylpiperidin-4-yl) sebacate, or (q) N,N',N",N'''-tetrakisf[4,6-bis(butyl-1-octyloxy-2,2,6,6-pentamethylpiperidin-4-yl)-amino-s-triazin-2-yl]-1,10-diamino-4,7-diazadecane.

The hindered amines substituted on the N-atom by a hydroxy-substituted alkoxy group are disclosed in copending application Ser. No. 09/257,711 whose relevant parts are also incorporated herein by reference.

The hindered amines substituted on the N-atom by a hydroxy-substituted alkoxy moiety which are useful in the instant invention include the following:

(a) 1-(2-hydroxy-2-methylpropoxy)-4-octadecanoyloxy-2,2,6,6-tetramethylpiperidine;

(b) 1-(2-hydroxy-2-methylpropoxy)-4-hydroxy-2,2,6,6-tetramethylpiperidine;

(c) 1-(2-hydroxy-2-methylpropoxy)-4-oxo-2,2,6,6-tetramethylpiperidine;

(d) bis(1-(2-hydroxy-2-methylpropoxy)-2,2,6,6-tetramethylpiperidin-4-yl) sebacate;

(e) bis(1-(2-hydroxy-2-methylpropoxy)-2,2,6,6-tetramethylpiperidin-4-yl) adipate;

(f) bis(1-(2-hydroxy-2-methylpropoxy)-2,2,6,6-tetramethylpiperidin-4-yl) succinate;

(g) bis(1-(2-hydroxy-2-methylpropoxy)-2,2,6,6-tetramethylpiperidin-4-yl) glutarate; and (h) 2,4-bis{N-[1-(2-hydroxy-2-methylpropoxy)-2,2,6,6-tetramethylpiperidin-4-yl]-N-butylamino}-6-(2-hydroxyethylamino)-s-triazine.

It is also contemplated that mixtures of the N-alkoxy or cyclohexyloxy substituted hindered amines; mixtures of the N-hydroxy-alkoxy substituted hindered amines; and mixtures of these two types of hindered amines can be used in the instant invention. Indeed, mixtures of these types of hindered amines along with conventional hindered amines where the N-atom is substituted by hydrogen, alkyl, acyl and the like are also contemplated as being useful in this invention.

Additionally, the stabilized candle wax composition may also include an antioxidant such as the phenolic antioxidants, phosphites or hydroxylamines.

The effective amount of the UV absorber in combination with the hindered amine and an antixoxidant in the candle wax is 0.01 to 10% by weight based on the wax; preferably is 0.1 to 2% by weight based on the wax; or most preferably is 0.1 to 0.5% by weight based on the wax.

Examples of such phenolic antioxidants and hydroxylamines include the following:

n-octadecyl 3,5-di-tert-butyl-4-hydroxyhydrocinnamate, neopentanetetrayl tetrakis(3,5-di-tert-butyl-4-hydroxyhydrocinammate), di-n-octadecyl 3,5-di-tert-butyl-4-hydroxybenzylphosphonate, 1,3,5-tris(3,5-di-tert-butyl-4-hydroxybenzyl) isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl) isocynurate, 1,1,3,-tris(2-methyl-4-hydroxy-5-tert-butylphenyl) butane, 1,3,5-tris[2-(3,5-di-tert-butyl-4-hydroxyhydrocinnamoyloxy)ethyl] isocyanurate, 3,5-di-(3,5-di-teit-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl) butyrate], octyl 3,5-di-tert-butyl-4-hydroxybenzylmercaptoacetate, bis(3,5-di-tert-butyl-4-hydroxyhydrocinnamoyl) hydrazide, N,N'-bis[2-(3,5-di-tert-butyl-4-hydroxyhydrocinnamoyloxy)-ethyl]oxamide, and N,N-dialkylhydroxylamine prepared from di(hydrogenated tallow)amine by direct oxidation.

A most preferred phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4-hydroxybenzyl) isocyanurate, 2,6-di-tert-butyl-p-cresol, or 2,2'-ethylidene-bis(4,6-di-tert-butylphenol).

It should be noted that candles contain a host of various components. The base materials may be made up of the following:

paraffin wax, natural oils, polyamide plus fatty acid/ester, fatty acids such as stearin, opacifiers, beeswax, glycerides plus oxidized wax, alcohols, and ethylene oligomers.

Candles also contain a number of additives such as the following:

mold release agents, fragrances, insect repellants or insecticides, hardeners, crystal modifiers, clarifiers, guttering reducers, colorants, f.p. control agents, stretchability improvers, gelling agents, extrusion aids, and vortex reducers.

Each of the various components are meant to control or modify the properties of the candle to insure proper burning, reduce channelling, aid in uniform melting, and the like. The colorants and fragrances obviously are there to provide the proper color, scent or other aesthetic appeal.

Candles may be scented or unscented; or they can be dyed or white (natural color of petroleum wax) or pigmented white; or they may be dipped into a solution of formulated wax to that a coating of said formulated wax is present only on the outside of the candle.

Of increasing importance are the transparent gel candles which look like clear glass, but which burn like a classical candle. As is discussed in detail in U.S. Pat. No. 5,879,694, the relevant parts of which are incorporated herein by reference, these gel candles usually contain a copolymer selected from the group consisting of a triblock, radial block, diblock or multiblock copolymer classically made up of at least two thermodynamically incompatible segments containing both hard and soft segments. Typical of such block copolymers is KRATON® (Shell Chemical Co.) which consists of block segments of styrene monomer units and rubber monomer or comonomer units. The most common structure found in KRATON® D series is a linear ABA block with styrene-butadiene-styrene (SBS) or styrene-isoprene-styrene (SIS).

Additionally, it is discovered that the use of a hindered amine substituted by an alkoxy moiety or by a hydroxy-substituted alkoxy moiety, as described above, even in the absence of a UV absorber provides to a candle made using candle wax stabilized therewith superior properties in terms of the prevention of the undesired channelling during the burning of the candle. This control or modification of burning properties of the candle leads to uniform burning in a controlled way and the prevention of undesired cavitation in the candle caused by uncontrolled and uneven burning.

The following examples are meant for illustrative purposes only and are not to be construed to limit the instant invention in any manner whatsoever.

Raw Materials

Fully refined wax with a melting point of 137–141° C. and <0.5% oil content is obtained from the Astor Wax Company.

Dyes are supplied by French Color and Chemical Corporation.

Additional wax samples are supplied by the Candle Corporation of America. These samples contained red, green or yellow dyes and fragrances.

The UV absorbers and hindered amine stabilizers are obtained from the Ciba Speciality Chemicals Corporation.

Sample Preparation

The wax samples obtained from the Candle Corporation of America already contain a dye and a fragrance (scent). In these cases, the wax is melted and the appropriate stabilizer (s) is (are) added and dissolved in the molten wax. The stabilized wax is then poured into a mold (7"×8.5"×0.25"; 17.78 cm×21.59 cm×0.635 cm) giving a wax plaque.

To the wax samples obtained from the Astor Wax Company after melting are added 0.001% by weight of the test dyes to give a dyed candle wax base. To the dyed wax base after melting is (are) added the appropriate stabilizer(s). The melted stabilized and dyed wax is then poured into the mold described above to give a wax plaque.

Sample Exposure

The wax plaques described above are cut into eight equal pieces (3.5"×2.125"; 8.89 cm×5.40 cm). Triplicate samples of each are exposed under a bank of six (6) cool-white fluorescent lamps (40 watts) or under a bank of six (6) UV lamps having a wavelength of 368 nm with the test samples being twelve (12) inches (30.48 cm) below the lamps.

Dye color fade (or color change) is measured by a Macbeth ColorEye Spectrophotometer with a 6 inch integrating sphere. The conditions are: 10 degree observer, D65 illuminant and 8 degree viewing angle.

Initial color measurements are taken using the above parameters. The L, a and b values are calculated using the CIE system from the reflectance values. YI is calculated from the L, a and b values. Subsequent measurements are taken at specified intervals. Delta L, a, b and YI values are simply the difference between the initial values and the values at each interval. Delta(A) E is calculated as follows:

$$[(\Delta L)^2+(\Delta a)^2+(\Delta b)^2]^{1/2}=\Delta E.$$

EXAMPLE 1

Color Fade of Red #C-15 in Unscented Candle Wax under Fluorescent Lamp Exposure A variety of different stabilizers are evaluated in unscented candle wax which contains Red #C-15 under fluorescent lamp exposure. The ΔE values represent the change in color after the indicated days of exposure. A low ΔE value indicates less change in color and is highly desired.

| Sample* | | ΔE after | |
| (wt % add) | 3 days | 6 days | 9 days |
| --- | --- | --- | --- |
| Blank (no add) | 2.35 | 5.58 | 8.69 |
| A (0.2%) | 2.32 | 2.72 | 3.35 |
| B (0.2%) | 1.13 | 2.02 | 2.90 |
| C (0.2%) | 1.92 | 4.31 | 7.16 |
| A (0.1%) + B (0.1%) | 0.27 | 0.55 | 0.75 |
| A (0.1%) + C (0.1%) | 0.35 | 0.32 | 0.62 |

*A is octyl 3-(benzotriazol-2-yl)-5-tert-butyl-4-hydroxyhydrocinnamate, TINUVIN ® 384, CIBA.
B is bis(1,2,2,6,6-pentamethylpiperdin-4-yl) sebacate, TINUVIN ® 292, CIBA).
C is bis(1-octyloxy-2,2,6,6-tetramethylpiperidin-4-yl) sebacate, TINUVIN ® 123, CIBA).

These data show that Compound C, a hindered amine substituted on the N-atom by an alkoxy moiety, does not stabilize candle wax when used alone as well as a conventional hindered amine Compound B, but when used in combination with a benzotriazole UV absorber provides far superior stabilization efficacy.

EXAMPLE 2

Color Fade of Red #C-15 in Unscented Candle Wax under UV Lamp Exposure

A variety of different stabilizers are evaluated in unscented candle wax which contains Red #C-15 under UV lamp exposure at 368 nm wavelength. The ΔE values represent the change in color after the indicated days of exposure. A low ΔE value indicates less change in color and is highly desired.

| Sample* | | ΔE after | |
| (wt % add) | 3 days | 11 days | 42 days |
| --- | --- | --- | --- |
| Blank (no add) | 12.99 | 32.85 | 33.42 |
| A (0.2%) | 1.31 | 4.93 | 14.49 |
| C (0.2%) | 9.52 | 23.85 | 32.51 |
| A (0.1%) + C (0.1%) | 1.12 | 3.12 | 7.48 |

*A is octyl 3-(benzotriazol-2-yl)-5-tert-butyl-4-hydroxyhydrocinnamate, TINUVIN ® 384, CIBA.
C is bis(1-octyloxy-2,2,6,6-tetramethylpiperidin-4-yl) sebacate, TINUVIN ® 123, CIBA).

These data show that Compound C, a hindered amine substituted on the N-atom by an alkoxy moiety, does not stabilize red candle wax when used alone as well as a conventional benzotriazole Compound A, but when used in combination with a benzotriazole UV absorber provides far superior stabilization efficacy than when either stabilizer are used alone.

EXAMPLE 3

Color Fade of Yellow #C-47 in Unscented Candle Wax under Fluorescent Lamp Exposure A variety of different stabilizers are evaluated in unscented candle wax which contains Yellow #C-47 under fluorescent lamp exposure. The ΔE values represent the change in color after the indicated days of exposure. A low ΔE value indicates less change in color and is highly desired.

| Sample* | | ΔE after | |
| (wt % add) | 9 days | 21 days | 40 days |
| --- | --- | --- | --- |
| A (0.2%) | 0.60 | 0.76 | 3.32 |
| D (0.2%) | 0.46 | 0.71 | 1.41 |
| D (0.1%) + E (0.1%) | 0.40 | 0.76 | 1.85 |
| C (0.2%) | 0.74 | 0.71 | 1.20 |
| A (0.1%) + C (0.1%) | 0.43 | 0.47 | 0.87 |

*A is octyl 3-(benzotriazol-2-yl)-5-tert-butyl-4-hydroxyhydrocinnamate, TINUVIN ® 384, CIBA.
C is bis(1-octyloxy-2,2,6,6-tetramethylpiperidin-4-yl) sebacate, TINUVIN ® 123, CIBA).
D is 2-(2-hydroxy-5-tert-octylphenyl)-2H-benzotriazole, TINUVIN ® 329, CIBA.
E is 4-octyloxy-2-hydroxybenzophenone, CHIMMASORB ® 81, CIBA.

The combination of a conventional benzotriazole Compound A with a hindered amine substituted on the N-atom by an alkoxy moiety provides far superior protection for the yellow dyed unscented candle than like stabilizers used alone.

EXAMPLE 4

Color Fade of Yellow #C-47 in Unscented Candle Wax under UV Lamp Exposure

A variety of different stabilizers are evaluated in unscented candle wax which contains Yellow #C-47 under UV lamp exposure at 368 nm wavelength. The ΔE values represent the change in color after the indicated days of exposure. A low ΔE value indicates less change in color and is highly desired.

| Sample* | | ΔE after | |
| (wt % add) | 41 days | 80 days | 121 days |
| --- | --- | --- | --- |
| Blank (no add) | 7.25 | 12.85 | 15.16 |
| A (0.2%) | 5.25 | 9.35 | 11.06 |
| C (0.2%) | 2.62 | 5.48 | 6.64 |
| A (0.1%) + B (0.1%) | 0.94 | 2.60 | 3.30 |
| A (0.1%) + C (0.1%) | 1.31 | 2.18 | 2.53 |

*A is octyl 3-(benzotriazol-2-yl)-5-tert-butyl-4-hydroxyhydrocinnamate, TINUVIN ® 384, CIBA.
B is bis(1,2,2,6,6-pentamethylpiperdin-4-yl) sebacate, TINUVIN ® 292, CIBA).
C is bis(1-octyloxy-2,2,6,6-tetramethylpiperidin-4-yl) sebacate, TINUVIN ® 123, CIBA).

These data show that Compound C, a hindered amine substituted on the N-atom by an alkoxy group in combination with a conventional benzotriazole UV absorber, clearly protect the yellow dye in the unscented candle wax far better than conventional UV absorber in combination with a conventional hindered amine Compound B.

EXAMPLE 5

Color Fade of Blue #C-19 in Unscented Candle Wax under Fluorescent Lamp Exposure A variety of different stabilizers are evaluated in unscented candle wax which contains Blue #C-19 under fluorescent lamp exposure. The ΔE values represent the change in color after the indicated days of exposure. A low ΔE value indicates less change in color and is highly desired.

| Sample* (wt % add) | 6 days | ΔE after 28 days | 54 days |
|---|---|---|---|
| Blank (none) | 9.74 | 42.51 | 44.00 |
| A (0.2%) | 0.37 | 3.57 | 11.29 |
| D (0.2%) | 0.47 | 2.69 | 8.14 |
| C (0.2%) | 5.60 | 11.05 | 14.55 |
| D (0.1%) + E (0.1%) | 0.47 | 2.57 | 7.71 |
| A (0.1%) + C (0.1%) | 0.32 | 2.23 | 4.12 |

*A is octyl 3-(benzotriazol-2-yl)-5-tert-butyl-4-hydroxyhydrocinnamate, TINUVIN ® 384, CIBA.
C is bis(1-octyloxy-2,2,6,6-tetramethylpiperidin-4-yl) sebacate, TINUVIN ® 123, CIBA).
D is 2-(2-hydroxy-5-tert-octylphenyl)-2H-benzotriazole, TINUVIN ® 329, CIBA.
E is 4-octyloxy-2-hydroxybenzophenone, CHIMMASORB ® 81, CIBA.

The combination of a conventional benzotriazole Compound A with a hindered amine substituted on the N-atom by an alkoxy moiety provides far superior protection for the blue dyed unscented candle than like stabilizers used alone.

EXAMPLE 6

Color Fade of Blue #C-19 in Unscented Candle Wax under UV Lamp Exposure

A variety of different stabilizers are evaluated in unscented candle wax which contains Blue #C-19 under UV lamp exposure at 368 nm wavelength. The ΔE values represent the change in color after the indicated days of exposure. A low ΔE value indicates less change in color and is highly desired.

| Sample* (wt % add) | 2 days | ΔE after 24 days | 42 days |
|---|---|---|---|
| Blank (no add) | 12.54 | 26.87 | 26.86 |
| A (0.2%) | 0.51 | 4.07 | 8.75 |
| D (0.2%) | 0.41 | 3.12 | 6.64 |
| C (0.2%) | 6.39 | 12.92 | 15.49 |
| D (0.1%) + E (0.1%) | 0.72 | 3.64 | 7.55 |
| A (0.1%) + C (0.1%) | 0.73 | 2.96 | 4.27 |

*A is octyl 3-(benzotriazol-2-yl)-5-tert-butyl-4-hydroxyhydrocinnamate, TINUVIN ® 384, CIBA.
C is bis(1-octyloxy-2,2,6,6-tetramethylpiperidin-4-yl) sebacate, TINUVIN ® 123, CIBA).
D is 2-(2-hydroxy-5-tert-octylphenyl)-2H-benzotriazole, TINUVIN ® 329, CIBA.
E is 4-octyloxy-2-hydroxybenzophenone, CHIMMASORB ® 81, CIBA.

The combination of a conventional benzotriazole Compound A with a hindered amine substituted on the N-atom by an alkoxy moiety provides far superior protection for the blue dyed unscented candle than like stabilizers used alone.

EXAMPLE 7

Color Change of a White Unscented Candle Wax under Fluorescent Lamp Exposure

The combination of 0.2% by weight of octyl 3-(p-methoxy-phenyl)-3-phenyl-o-cyanoacrylate and 0.2% by weight of the oligomeric compound which is the condensation product of 4,4'-hexamethylenebis(amino-2,2,6,6-tetramethylpiperidine) and 2,4-dichloro-6-[(1-cyclohexyloxy-2,2,6,6-tetramethylpiperidin-4-yl) butylamino]-s-triazine end-capped with 2-chloro-4,6-bis (dibutylamino)-s-triazine protect the white unscented candle wax well from discoloration.

EXAMPLE 8

Color Change of White Unscented Candle Wax under UV Lamp Exposure

The combination of 0.2% by weight of pentaerythrityl tetrakis[3,3-diphenyl-α-cyanoacrylate] and 0.2% by weight of 1-methoxy-4-hydroxy-2,2,6,6-tetrimethylpiperidine protect the white unscented candle wax well from discoloration.

EXAMPLE 9

Color Change of Yellow Scented Candle Wax under Fluorescent Lamp Exposure

A variety of different stabilizers are evaluated in yellow scented candle wax obtained from the Candle Corporation of America under fluorescent lamp exposure. The ΔE values represent the change in color after the indicated days of exposure. A low ΔE value indicates less change in color and is highly desired.

| Sample* (wt % add) | 9 days | ΔE after 20 days | 26 days |
|---|---|---|---|
| Blank (no add) | 6.15 | 9.41 | 9.27 |
| A (0.2%) | 5.07 | 8.02 | 8.54 |
| D (0.2%) | 5.28 | 8.29 | 9.20 |
| E (0.2%) | 4.62 | 7.67 | 8.83 |
| A (0.1%) + C (0.1%) | 4.43 | 7.37 | 8.20 |

*A is octyl 3-(benzotriazol-2-yl)-5-tert-butyl-4-hydroxyhydrocinnamate, TINUVIN ® 384, CIBA.
C is bis(1-octyloxy-2,2,6,6-tetramethylpiperidin-4-yl) sebacate, TINUVIN ® 123, CIBA).
D is 2-(2-hydroxy-5-tert-octylphenyl)-2H-benzotriazole, TINUVIN ® 329, CIBA.
E is 4-octyloxy-2-hydroxybenzophenone, CHIMMASORB ® 81, CIBA.

These data show that a combination of a conventional benzotriazole UV absorber with a hindered amine having the N-atom substituted by an alkoxy moiety provides superior resistance to discoloration than the benzotriazole alone.

EXAMPLE 10

Color Change of Yellow Scented Candle Wax under UV Lamp Exposure

A variety of different stabilizers are evaluated in yellow scented candle wax obtained from the Candle Corporation of America under UV lamp exposure at 368 nm wavelength. The ΔE values represent the change in color after the indicated days of exposure. A low ΔE value indicates less change in color and is highly desired.

| Sample* (wt % add) | 7 days | ΔE after 11 days | 15 days |
|---|---|---|---|
| Blank (no add) | 4.88 | 4.97 | 5.06 |
| A (0.2%) | 3.16 | 3.54 | 4.33 |
| D (0.2%) | 3.56 | 4.06 | 5.05 |
| E (0.2%) | 4.57 | 5.41 | 5.92 |
| D (0.1%) + E (0.1%) | 3.96 | 4.50 | 5.35 |
| A (0.1%) + C (0.1%) | 2.69 | 3.23 | 3.72 |

*A is octyl 3-(benzotriazol-2-yl)-5-tert-butyl-4-hydroxyhydrocinnamate, TINUVIN ® 384, CIBA.
C is bis(1-octyloxy-2,2,6,6-tetramethylpiperidin-4-yl) sebacate, TINUVIN ® 123, CIBA).
D is 2-(2-hydroxy-5-tert-octylphenyl)-2H-benzotriazole, TINUVIN ® 329, CIBA.
E is 4-octyloxy-2-hydroxybenzophenone, CHIMMASORB ® 81, CIBA.

These data show that a combination of a conventional benzotriazole UV absorber with a hindered amine having the N-atom substituted by an alkoxy moiety provides superior resistance to discoloration than using a benzotriazole alone.

EXAMPLE 11

Color Fade of Red Scented Candle Wax under UV Lamp Exposure

A variety of different stabilizers are evaluated in red scented candle wax obtained from the Candle Corporation of America under UV lamp exposure at 368 nm wavelength. The ΔE values represent the change in color after the indicated days of exposure. A low ΔE value indicates less change in color and is highly desired.

| Sample* (wt % add) | 16 days | ΔE after 35 days | 54 days |
|---|---|---|---|
| Blank (no add) | 21.54 | 50.82 | 52.51 |
| A (0.2%) | 5.85 | 7.05 | 7.77 |
| D (0.2%) | 5.59 | 6.92 | 7.67 |
| E (0.2%) | 6.58 | 11.15 | 12.58 |
| D (0.1%) + E (0.1%) | 5.25 | 6.47 | 7.32 |
| A (0.1%) + C (0.1%) | 4.56 | 5.22 | 5.46 |

*A is octyl 3-(benzotriazol-2-yl)-5-tert-butyl-4-hydroxyhydrocinnamate, TINUVIN ® 384, CIBA.
C is bis(1-octyloxy-2,2,6,6-tetramethylpiperidin-4-yl) sebacate, TINUVIN ® 123, CIBA).
D is 2-(2-hydroxy-5-tert-octylphenyl)-2H-benzotriazole, TINUVIN ® 329, CIBA.
E is 4-octyloxy-2-hydroxybenzophenone, CHIMMASORB ® 81, CIBA.

These data show that a combination of a conventional benzotriazole UV absorber with a hindered amine having the N-atom substituted by an alkoxy moiety provides superior resistance to discoloration than using a benzotriazole alone.

EXAMPLE 12

Color Fade of Green Scented Candle Wax under Fluorescent Lamp Exposure

A variety of different stabilizers are evaluated in green scented candle wax obtained from the Candle Corporation of America under flourescent lamp exposure. The ΔE values represent the change in color after the indicated days of exposure. A low ΔE value indicates less change in color and is highly desired.

| Sample* (wt % add) | 9 days | ΔE after 14 days | 26 days |
|---|---|---|---|
| Blank (no add) | 5.05 | 4.88 | 10.94 |
| A (0.2%) | 2.92 | 2.66 | 7.13 |
| D (0.2%) | 3.23 | 2.64 | 7.42 |
| E (0.2%) | 2.82 | 2.55 | 7.76 |
| D (0.1%) + E (0.1%) | 2.46 | 1.94 | 6.15 |
| A (0.1%) + B (0.1%) | 2.84 | 1.43 | 2.15 |
| A (0.1%) + C (0.1%) | 2.42 | 0.95 | 1.93 |

*A is octyl 3-(benzotriazol-2-yl)-5-tert-butyl-4-hydroxyhydrocinnamate, TINUVIN ® 384, CIBA.
B is bis(1,2,2,6,6-pentamethylpiperdin-4-yl) sebacate, TINUVIN ® 292, CIBA).
C is bis(1-octyloxy-2,2,6,6-tetramethylpiperidin-4-yl) sebacate, TINUVIN ® 123, CIBA).
D is 2-(2-hydroxy-5-tert-octylphenyl)-2H-benzotriazole, TINUVIN ® 329, CIBA.
E is 4-octyloxy-2-hydroxybenzophenone, CHIMMASORB ® 81, CIBA.

These data show that a combination of a conventional benzotriazole UV absorber with a hindered amine provides far better stabilization efficacy than a benzotriazole alone at the same total concentration; and especially when the hindered amine is substituted on the N-atom by an alkoxy moiety.

EXAMPLE 13

Color Fade of Green Scented Candle Wax under UV Lamp Exposure

A variety of different stabilizers are evaluated in green scented candle wax obtained from the Candle Corporation of America under UV lamp exposure at 368 nm wavelength. The ΔE values represent the change in color after the indicated days of exposure. A low ΔE value indicates less change in color and is highly desired.

| Sample* (wt % add) | 7 days | ΔE after 17 days | 25 days |
|---|---|---|---|
| Blank (no add) | 6.35 | 8.89 | 9.93 |
| A (0.2%) | 0.26 | 1.34 | 1.94 |
| D (0.2%) | 0.73 | 2.11 | 2.86 |
| E (0.2%) | 4.17 | 7.39 | 8.73 |
| D (0.1%) + E (0.1%) | 1.64 | 3.45 | 4.48 |
| A (0.1%) + C (0.1%) | 0.36 | 0.78 | 1.22 |

*A is octyl 3-(benzotriazol-2-yl)-5-tert-butyl-4-hydroxyhydrocinnamate, TINUVIN ® 384, CIBA.
C is bis(1-octyloxy-2,2,6,6-tetramethylpiperidin-4-yl) sebacate, TINUVIN ® 123, CIBA).
D is 2-(2-hydroxy-5-tert-octylphenyl)-2H-benzotriazole, TINUVIN ® 329, CIBA.
E is 4-octyloxy-2-hydroxybenzophenone, CHIMMASORB ® 81, CIBA.

These data show that conventional benzotriazole UV absorbers are far superior to benzophenone UV absorbers in protecting the green scented candle wax from discoloration, but that a combination of a conventional benzotriazole UV absorber with a hindered amine substituted on the N-atom by an alkoxy moiety provides far superior stabilization from discoloration.

EXAMPLE 14

Color Fade of Blue Scented Candle Wax under Fluorescent Lamp Exposure

A variety of different stabilizers are evaluated in blue scented candle wax obtained from the Candle Corporation of America under fluorescent lamp exposure. The ΔE values represent the change in color after the indicated days of exposure. A low ΔE value indicates less change in color and is highly desired.

| Sample* (wt % add) | 9 days | ΔE after 14 days | 26 days |
|---|---|---|---|
| Blank (no add) | 6.61 | 7.90 | 12.03 |
| A (0.2%) | 5.40 | 6.23 | 8.50 |
| D (0.2%) | 4.69 | 5.61 | 7.90 |
| E (0.2%) | 4.76 | 4.93 | 7.60 |
| D (0.1%) + E (0.1%) | 4.60 | 5.14 | 7.62 |
| A (0.1%) + C (0.1%) | 4.23 | 4.95 | 6.44 |

*A is octyl 3-(benzotriazol-2-yl)-5-tert-butyl-4-hydroxyhydrocinnamate, TINUVIN ® 384, CIBA.
C is bis(1-octyloxy-2,2,6,6-tetramethylpiperidin-4-yl) sebacate, TINUVIN ® 123, CIBA).
D is 2-(2-hydroxy-5-tert-octylphenyl)-2H-benzotriazole, TINUVIN ® 329, CIBA.
E is 4-octyloxy-2-hydroxybenzophenone, CHIMMASORB ® 81, CIBA.

These data show that a combination of a conventional benzotriazole UV absorber with a hindered amine substituted on the N-atom by an alkoxy moiety provides far superior stabilization from discoloration for the blue scented candle wax than a UV absorber alone.

EXAMPLE 15

Color Fade of Blue Scented Candle Wax under UV Lamp Exposure

A variety of different stabilizers are evaluated in blue scented candle wax obtained from the Candle Corporation of America under UV lamp exposure at 368 nm wavelength. The ΔE values represent the change in color after the indicated days of exposure. A low ΔE value indicates less change in color and is highly desired.

| Sample* (wt % add) | 16 days | ΔE after 36 days | 54 days |
|---|---|---|---|
| Blank (no add) | 32.88 | 40.61 | 43.82 |
| A (0.2%) | 8.86 | 13.58 | 16.05 |
| D (0.2%) | 8.30 | 14.76 | 18.75 |
| E (0.2%) | 15.20 | 19.49 | 22.94 |
| D (0.1%) + E (0.1%) | 9.42 | 15.80 | 19.53 |
| A (0.1%) + B (0.1%) | 5.59 | 8.42 | 9.57 |
| A (0.1%) + C (0.1%) | 5.89 | 7.19 | 8.03 |

*A is octyl 3-(benzotriazol-2-yl)-5-tert-butyl-4-hydroxyhydrocinnamate, TINUVIN ® 384, CIBA.
B is bis(1,2,2,6,6-pentamethylpiperdin-4-yl) sebacate, TINUVIN ® 292, CIBA).
C is bis(1-octyloxy-2,2,6,6-tetramethylpiperidin-4-yl) sebacate, TINUVIN ® 123, CIBA).
D is 2-(2-hydroxy-5-tert-octylphenyl)-2H-benzotriazole, TINUVIN ® 329, CIBA.
E is 4-octyloxy-2-hydroxybenzophenone, CHIMMASORB ® 81, CIBA.

These data show that a combination of a conventional UV absorber with a hindered amine provides a significantly better protection for the blue scented candle wax than a UV absorber alone. When the hindered amine is also substituted on the N-atom by an alkoxy moiety even much better stabilization efficacy is achieved.

EXAMPLE 16

Green scented candle wax as described in Example 12 is well stabilized by 0.2% by weight of dimethyl p-methoxybenzylidenemalonate, SANDUVOR® PR 25, in combination with 0.2% by weight of bis(1-octyloxy-2,2,6,6-tetramethylpiperidin-4-yl) sebacate, TINUVIN® 123, CIBA.

EXAMPLE 17

Yellow scented candle wax as described in Example 10 is well stabilized by 0.1% by weight of di(1,2,2,6,6-pentamethylpiperidin-4-yl) p-methoxybenzylidenemalonate, SANDUVOR® PR 31, in combination with 0.1% by weight of 1-(2-hydroxy-2-methylpropoxy)-4-octadecanoyloxy-2,2,6,6-tetramethylpiperidine.

EXAMPLE 18

Red unscented candle wax as described in Example 1 is well stabilized by 0.1% by weight of dimethyl di(p-chlorophenyl)methylenemalonate in combination with 0.1% by weight of bis(1-(2-hydroxy-2-methylpropoxy)-2,2,6,6-tetramethylpiperidin-4-yl) glutarate.

EXAMPLE 19

Red unscented candle wax as described in Example 2 is well stabilized by 0.2% by weight of dimethyl di(p-methoxyphenyl)methylenemalonate in combination with 0.2% by weight of bis(1-(2-hydroxy-2-methylpropoxy)-2,2,6,6-tetramethylpiperidin-4-yl) succinate.

EXAMPLE 20

Red unscented candle wax as described in Example 1 is well stabilized by 0.1% by weight of 4,4'-dimethoxy-2,2'-dihydroxybenzophenone in combination with 0.1% by weight of bis(1-octyloxy-2,2,6,6-tetramethylpiperidin-4-yl) sebacate, TINLVIN® 123, CIBA).

EXAMPLE 21

Red unscented candle wax as described in Example 2 is well stabilized by 0.2% by weight of 4-tert-butylphenyl 2-hydroxybenzoate in combination with 0.1% by weight of 2,4-bis[(1-cyclohyloxy-2,2,6,6-tetamethylpiperidin-4-yl) butylamino-6-]2-hydroxyethylamino-s-triazine.

EXAMPLE 22

Yellow unscented candle wax as described in Example 3 is well stabilized by 0.2% by weight of 2-ethoxy-2-ethyloxanilide in combination with 0.1% by weight of bis(1-cyclohexyloxy-2,2,6,6-tetramethylpiperidin-4-yl) sebacate.

EXAMPLE 23

Yellow unscented candle wax as described in Example 4 is well stabilized by 0.2% by weight of 3-hydroxyphenyl benzoate in combination with 0.2% by weight of 1-cyclohexyloxy-2,2,6,6-tetramethyl-4-octadecylaminopiperidine.

EXAMPLE 24

Blue unscented candle wax as described in Example 5 is well stabilized by 0.2% by weight of dodecyl 3-phenyl-3-methyl-α-cyanoacrylate in combination with 0.1% by weight of bis(1-cyclohexyloxy-2,2,6,6-tetramethylpiperidin-4-yl) adipate.

EXAMPLE 25

Blue unscented candle wax as described in Example 6 is well stabilized by 0.2% by weight of dodecyl 3,3-diphenyl-α-cyanoacrylate in combination with 0.2% by weight of the oligomeric compound which is the condensation product of 4,4'-hexamethylene-bis(amino-2,2,6,6-tetramnethylpiperidine) and 2,4-dichloro-6-[(1-octyloxy-2,2,6,6-tetra-methylpiperidin-4-yl)butylamino]-s-triazine end-capped with 2-chloro-4,6-bis(dibutylamino)-s-triazine.

EXAMPLE 26

Yellow scented candle wax as described in Example 9 is well stabilized by 0.2% by weight of 2-{2-hydroxy-3-tert-butyl-5-[2-(omega-hydroxy-octa(ethyleneoxy)carbonyl)-ethyl]phenyl}-2H-benzotriazole, TINUVIN® 1130, CIBA, in combination with 1-octyloxy-4-hydroxy-2,2,6,6-tetramethylpiperidine.

EXAMPLE 27

Yellow scented candle wax as described in Example 10 is well stabilized by 0.1% by weight of 2-[2-hydroxy-3-(α,α-dimethylbenzyl)-5-tert-octylphenyl]-2H-benzotriazole, TINUVIN® 928, CIBA, in combination with 0.2% by weight of 1-cyclohexyloxy-4-hydroxy-2,2,6,6-tetramethylpiperidine.

EXAMPLE 28

Red scented candle wax as described in Example 11 is well stabilized by 0.1% by weight of 5-chloro-2-(2-hydroxy-3-tert-butyl-5-methylphenyl)-2H-benzotriazole, TINUVIN® 326, CIBA, in combination with 0.1% by weight of 1-cyclohexyloxy-4-oxo-2,2,6,6-tetramethylpiperidine.

EXAMPLE 29

Green scented candle wax as described in Example 12 is well stabilized by 0.1% by weight of octyl 3-(benzotriazol-2-yl)-5-tert-butyl-4-hydroxyhydrocinnamate, TINUVIN® 384, CIBA, in combination with 0.1% by weight of 1 octyloxy-4-oxo-2,2,6,6-tetramethylpiperidine.

EXAMPLE 30

Green scented candle wax as described in Example 13 is well stabilized by 0.1% by weight of octyl 3-(benzotriazol-2-yl)-5-tert-butyl-4-hydroxyhydrocinnamate, TINUVIN® 384, CIBA, in combination with 0.1% by weight of 1-(2-hydroxy-2-methyl-propoxy)-4-octadecanoyloxy-2,2,6,6-tetramethylpiperidine.

EXAMPLE 31

Blue scented candle wax as described in Example 14 is well stabilized by 0. 1% by weight of 2-(2-hydroxy-5-tert-octylphenyl-2H-benzotriazole, TINUVIN® 329, in combination with 0.1% by weight of 1-(2-hydroxy-2-methylpropoxy)-4-hydroxy-2,2,6,6-tetramethylpiperidine.

EXAMPLE 32

Blue scented candle wax as described in Example 15 is well stabilized by 0.2% by weight of 4-octyloxy-2-hydroxybenzophenone in combination with 0.1% by weight of 1-(2-hydroxy-2-methylpropoxy)-4-oxo-2,2,6,6-tetramethylpiperidine.

EXAMPLE 33

Red unscented candle wax as described in Example 1 is well stabilized by 0.2% by weight of 2-ethyihexyl p-methoxycinnamate in combination with 0.1% by weight of bis(1-(2-hydroxy-2-methylpropoxy)-2,2,6,6-tetramethylpiperidin-4-yl) sebacate.

EXAMPLE 34

Red unscented candle wax as described in Example 2 is well stabilized by 0.1% by weight of 4,4'-dimethoxy-2, 2'dihydroxybenzophenone in combination with 0.1% by weight of bis(1-(2-hydroxy-2-methylpropoxy)-2,2,6,6-tetramethylpiperidin-4-yl) adipate.

EXAMPLE 35

Yellow unscented candle wax as described in Example 3 is well stabilized by 0.1% by weight of 2-ethoxy-2'-ethyl-5,4'-di-tert-butyloxanilide in combination with 0.1% by weight of bis(1-(2-hydroxy-2-methylpropoxy)-2,2,6,6-tetramethylpiperidin-4-yl) succinate.

EXAMPLE 36

Yellow unscented candle wax as described in Example 4 is well stabilized by 0.1% by weight of 2,4-bis(2,4-dimethylphenyl)-6-[2-hydroxy-4-(3-do-/tri-decyloxy-2-hydroxypropoxy)phenyl]-s-triazine, TINUVIN® 400, CIBA, in combination with 0.1% by weight of bis(1-octyloxy-2,2,6,6-tetramethylpiperidin-4-yl) sebacate, TINUVIN® 123, CIBA).

EXAMPLE 37

Blue scented candle wax as described in Example 14 is well stabilized by 0.1% by weight of 2,4-bis(2,4-dimethylphenyl)-6-[2-hydroxy-4-(3-do-/tri-decyloxy-2-hydroxypropoxy)-5-α-cumylphenyl]-s-triazine in combination with 0.1% by weight of 2,4-bis(1-cyclohexyloxy-2,2,6, 6-tetramethylpiperidin-4-yl)butylaminol-6-(2-hydroxyethylamino-s-triazine.

EXAMPLE 38

Blue unscented candle wax as described in Example 5 is well stabilized by 0.2% by weight of 2,4-bis(2,4- dimethylphenyl)-6-(2-hydroxy-4-octyloxyphenyl)-s-triazine in combination with 0.1% by weight of 1-(2-hydroxy-2-methylpropoxy)-4-octadecanoyloxy-2,2,6,6-tetramethylpiperidine.

EXAMPLE 39

Blue unscented candle wax as described in Example 6 is well stabilized by 0.1% by weight of 2,4-bis(2,4-dimethylphenyl)-6-[2-hydroxy-4-(3-do-/tri-decyloxy-2-hydroxypropoxy)phenyl]-s-triazine, TINUVIN® 400, CIBA, in combination with 0.1% by weight of bis(1-(2-hydroxy-2-methylpropoxy)-2,2,6,6-tetramethylpiperidin-4-yl) sebacate.

EXAMPLE 40

White unscented candle wax as described in Example 7 is well stabilized by 0.1% by weight of 4-tert-octylphenyl 2-hydroxybenzoate in combination with bis(1-(2-hydroxy-2-methylpropoxy)-2,2,6,6-tetramethylpiperidin-4-yl) adipate.

EXAMPLE 41

White unscented candle wax as described in Example 8 is well stabilized by 0.1% by weight of 3-hydroxyphenyl benzoate in combination with 0.1% by weight of bis(1-(2-hydroxy-2-methylpropoxy)-2,2,6,6-tetramethylpiperidin-4-yl) succinate.

EXAMPLE 42

Yellow scented candle wax as described in Example 9 is well stabilized by 0.1% by weight of dodecyl 3,3-diphenyl-α-cyanoacrylate in combination with 0.1% by weight of bis(1-(2-hydroxy-2-methylpropoxy)-2,2,6,6-tetramethylpiperidin-4-yl) glutarate.

EXAMPLE 43

Yellow scented candle wax as described in Example 10 is well stabilized by 0.1% by weight of pentaerythrityl tetrakis [3,3-diphenyl-α-cyanoacrylate] in combination with 0.2% by weight of 2,4-bis{N-[1-(2-hydroxy-2-methylpropoxy)-2, 2,6,6-tetramethyl-piperidin-4-yl]-N-butylamino}-6-(2-hydroxyethylamino)-s-triazine.

EXAMPLE 44

Red scented candle wax as described in Example 11 is well stabilized by 0.2% by weight of octyl 3-(p-methoxyphenyl)-3-phenyl-α-cyanoacrylate in combination with 0.2% by weight of 1-(2-hydroxy-2-methylpropoxy)-4-octadecanoyloxy-2,2,6,6-tetramethylpiperidine.

What is claimed is:

1. A composition which comprises
   (a) candle wax which is white and unscented; white and scented; dyed and unscented; dyed and scented; dipped and unscented; or dipped and scented, and
   (b) an effective stabilizing amount of a combination of
      (i) a UV absorber, and
      (ii) a hindered amine substituted on the N-atom with an alkoxy, cycloalkoxy or a hydroxy-substituted alkoxy group or mixture of said hindered amines, wherein the ratio by weight of (i) to (ii) is from 10:1 to 1:10.

2. A composition according to claim 1 wherein the ratio by weight of (i) to (ii) is from 4:1 to 1:4.

3. A composition according to claim 2 wherein the ratio by weight of (i) to (ii) is from 2:1 to 1:2.

4. A composition according to claim 1 wherein the effective amount of the UV absorber plus the hindered amine in the candle wax is 0.01 to 10% by weight based on the wax.

5. A composition according to claim 4 wherein the effective amount of the UV absorber plus hindered amine in the candle wax is 0.1 to 2% by weight based on the wax.

6. A composition according to claim 5 wherein the effective amount of the UV absorber plus hindered amine in the candle wax is 0.1 to 0.5% by weight based on the wax.

7. A composition according to claim 1 wherein the UV absorber of component (i) is a benzotriazole, a benzophenone, an α-cyanoacrylate, an oxanilide, an s-triazine, a cinnamate, a malonate, a benzoate or a salicylate or a mixture thereof.

8. A composition according to claim 7 wherein the UV absorber is a benzotriazole, a benzophenone or an s-triazine.

9. A composition according to claim 8 wherein the UV absorber is a benzotriazole.

10. A composition according to claim 7 wherein the UV absorber is
    (a) 4-octyloxy-2-hydroxybenzophenone;
    (b) 4-methoxy-2-hydroxybenzophenone;
    (c) 2-(2-hydroxy-5-methylphenyl)-2H-benzotriazole;
    (d) 2-(2-hydroxy-5-tert-octylphenyl-2H-benzotriazole;
    (e) 2-(2-hydroxy-3,5-di-tert-amylphenyl)-2H-benzotriazole;
    (f) octyl 3-(benzotriazol-2-yl)-5-tert-butyl-4-hydroxyhydrocinnamate;
    (g) 2-(2-hydroxy-3,5-di-tert-butylphenyl)-2H-benzotriazole;
    (h) 2-(2-hydroxy-5-tert-butylphenyl)-2H-benzotriazole;
    (i) 5-chloro-2-(2-hydroxy-3,5-di-tert-butylphenyl)-2H-benzotriazole;
    (g) 5-chloro-2-(2-hydroxy-3-tert-butyl-5-methylphenyl)-2H-benzotriazole;
    (k) 2-(2-hydroxy-3-sec-butyl-5-tert-butylphenyl)-2H-benzotriazole;
    (l) 2-(2-hydroxy-4-octyloxyphenyl)-2H-benzotriazole;
    (m) 2-(2-hydroxy-3-dodecyl-5-methylphenyl)-2H-benzotriazole;
    (n) 2-[2-hydroxy-3,5-di(α,α-dimethylbenzyl)phenyl]-2H-benzotriazole;
    (o) 2-[2-hydroxy-3-(α,α-dimethylbenzyl)-5-tert-octylpheny]-2H-benzotriazole;
    (p) 2-{2-hydroxy-3-tert-butyl-5-[2-(omega-hydroxy-octa (ethyleneoxy)carbonyl)-etheyl]phenyl}-2H-benzotriazole; and
    (q) 2-{2-hydroxy-3-tert-butyl-5-[2-(octyloxy)carbonyl) ethyl]phenyl}-2H-benzotriazole;
    (r) 2-ethylhexyl p-methoxycinnamate;
    (s) 4-methoxy-2,2'-dihydroxybenzophenone;
    (t) 4,4'dimethoxy-2,2'-dihydroxybenzophenone;
    (u) 2,4-bis(2,4-dimethylphenyl)-6-(2-hydroxy-4-octyloxyphenyl)-s-triazine;
    (v) 2,4-diphenyl-6-(2-hydroxy-4hexyloxyphenyl)-s-triazine;
    (w) 2,4-bis(2,4-dimethylphenyl)-6-[2-hydroxy-4-(3-do-/tri-decyloxy-2-hydroxypropoxy)phenyl]-s-triazine; or
    (x) 2,4-bis(2,4-dimethylphenyl)-6-[2-hydroxy-4-(3-do-/tri-decyloxy-2-hydroxypropoxy)-5-α-cumylphenyl]-s-triazine.

11. A composition according to claim 10 wherein the UV absorber is
   (a) 4-octyloxy-2-hydroxybenzophenone;
   (b) 4-methoxy-2-hydroxybenzophenone;
   (d) 2-(2-hydroxy-5-tert-octylphenyl-2H-benzotriazole;
   (o) 2-[2-hydroxy-3-(α,α-dimethylbenzyl)-5-tert-octylphenyl]-2H-benzotriazole;
   (p) 2-{2-hydroxy-3-tert-butyl-5-[2-(omega-hydroxy-octa(ethyleneoxy)carbonyl)-ethyl]phenyl}-2H-benzotriazole; or
   (q) 2-{2-hydroxy-3-tert-butyl-5-[2-(octyloxy)carbonyl)ethyl]phenyl}-2H-benzotriazole.

12. A composition according to claim 1 wherein the hindered amine of component (ii) is
   (a) bis(1-octyloxy-2,2,6,6-tetramethylpiperidin-4-yl) sebacate;
   (b) bis(1-cyclohexyloxy-2,2,6,6-tetramethylpiperidin-4-yl) sebacate;
   (c) 1-cyclohexyloxy-2,2,6,6-tetramethyl-4-octadecylaminopiperidine;
   (d) 2,4-bis[(1-cyclohexyloxy-2,2,6,6-tetramethylpiperidin-4-yl]butylamino]-6-(2-hydroxyethylamino-s-triazine;
   (e) bis(1-cyclohexyloxy-2,2,6,6-tetramethylpiperidin-4-yl) adipate;
   (f) the oligomeric compound which is the condensation product of 4,4'-hexamethylenebis(amino-2,2,6,6-tetramethylpiperidine) and 2,4-dichloro-6-[(1-octyloxy-2,2,6,6-tetramethylpiperidin-4-yl)butylamino]-s-triazine end-capped with 2-chloro-4,6-bis(dibutylamino)-s-triazine;
   (g) the oligomeric compound which is the condensation product of 4,4'-hexamethylenebis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine;
   (h) 1-methoxy-4-hydroxy-2,2,6,6-tetramethylpiperidine;
   (i) 1-octyloxy-4-hydroxy-2,2,6,6-tetramethylpiperidine;
   (j) 1-cyclohexyloxy-4-hydroxy-2,2,6,6-tetramethylpiperidine;
   (k) 1-methoxy-4-oxo-2,2,6,6-tetramethylpiperidine;
   (l) 1-octyloxy-4-oxo-2,2,6,6-tetramethylpiperidine;
   (m) 1-cyclohexy-oxy-4-oxo-2,2,6,6-tetramethylpiperidine ,
   (n) bis(1-heptyloxy-2,2,6,6-tetramethylpiperidin-4-yl) sebacate,
   (o) bis(1-nonyloxy-2,2,6,6-tetramethylpiperidin-4-yl) sebacate,
   (p) bis(1-dodecyloxy-2,2,6,6-tetramethylpiperidin-4-yl) sebacate, or
   (q) N,N',N'',N'''-tetrakis[(4,6-bis(butyl-1-octyloxy-2,2,6,6-pentamethylpiperidin-4-yl)-amino-s-triazin-2-yl]-1,10-diamino-4,7-diazadecane.

13. A composition according to claim 1 wherein the hindered amine of component (ii) is
   (a) 1-(2-hydroxy-2-methylpropoxy)-4-octadecanoyloxy-2,2,6,6-tetramethylpiperidine;
   (b) 1-(2-hydroxy-2-methylpropoxy)-4-hydroxy-2,2,6,6-tetramethylpiperidine;
   (c) 1-(2-hydroxy-2-methylpropoxy)-4-oxo-2,2,6,6-tetramethylpiperidine;
   (d) bis(1-(2-hydroxy-2-methylpropoxy)-2,2,6,6-tetramethylpiperidin-4-yl) sebacate;
   (e) bis(1-(2-hydroxy-2-methylpropoxy)-2,2,6,6-tetramethylpiperidin-4-yl) adipate;
   (f) bis(1-(2-hydroxy-2-methylpropoxy)-2,2,6,6-tetramethylpiperidin-4-yl) succinate;
   (g) bis(1-(2-hydroxy-2-methylpropoxy)-2,2,6,6-tetramethylpiperidin-4-yl) glutarate; or
   (h) 2,4-bis{N-[1-(2-hydroxy-2-methylpropoxy)-2,2,6,6-tetramethylpiperidin-4-yl]-N-butylamino}-6-(2-hydroxyethylamino)-s-triazine.

14. A composition according to claim 1 wherein component (i) is octyl 3-(benzotriazol-2-yl)-5-tert-butyl-4-hydroxyhydrocinnamate, and component (ii) is bis(1-octyloxy-2,2,6,6-tetramethylpiperidin-4-yl) sebacate.

15. A composition according to claim 1 wherein the composition also contains an antioxidant.

16. A composition according to claim 15 wherein the antioxidant is a phenolic antioxidant, phosphite or hydroxylamine, or mixture thereof.

17. A composition according to claim 15 wherein the effective amount of UV absorber in combination with the hindered amine and an antioxidant is 0.01 to 10% by weight based on the wax.

18. A composition according to claim 17 wherein the effective amount of UV absorber in combination with the hindered amine and an antioxidant is 0.1 to 2% by weight based on the wax.

19. A composition according to claim 18 wherein the effective amount of UV absorber in combination with the hindered amine and an antioxidant is 0.1 to 0.5% by weight based on the wax.

20. A composition according to claim 15 wherein the antioxidant is n-octadecyl 3,5-di-tert-butyl-4-hydroxyhydrocinnamate, neopentanetetrayl tetrakis(3,5-di-tert-butyl-4-hydroxyhydrocinnammate), di-n-octadecyl 3,5-di-tert-butyl-4-hydroxybenzylphosphonate, 1,3,5-tris(3,5-di-tert-butyl-4-hydroxybenzyl) isocyanurate, thiodiethylene bis(3,5-di-tert-butyl-4-hydroxyhydrocinnamate), 1,3,5-trimethyl-2,4,6-tris(3,5-di-tert-butyl-fhydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl) isocynurate, 1,1,3,-tris(2-methyl-4-hydroxy-5-tert-butylphenyl) butane, 1,3,5-tris[2-(3,5-di-tert-butyl-4-hydroxyhydrocinnamoyloxy)ethyl] isocyanurate, 3,5di-(3,5-di-tert-butyl-4-hydroxybenzyl)mesitol, hexamethylene bis(3,5-di-tert-butyl-4-hydroxyhydrocinnarnate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl) butyrate],
octyl 3,5-di-tert-butyl-4-hydroxybenzylmercaptoacetate,
bis(3,5-di-tert-butyl-4-hydroxyhydrocinnamoyl) hydrazide,
N,N'-bis[2-(3,5-di-tert-butyl-4-hydroxyhydrocinnamoyloxy)-ethyl]oxamide, or
N,N-dialkylhydroxylamine prepared from di(hydrogenated tallow)amine by direct oxidation.

21. A composition according to claim 20 wherein the antioxidant is neopentanetetrayl tetrakis(3,5-di-tert-butyl-4-hydroxyhydrocinnamate),
n-octadecyl 3,5-di-tert-butyl-4-hydroxyhydrocinnamate,
1,3,5-trimethyl-2,4,6-tris(3,5-di-tert-butyl-4-hydroxybenzyl)benzene,
1,3,5-tris(3,5-di-tert-butyl-4-hydroxybenzyl) isocyanurate,
2,6-di-tert-butyl-p-cresol, or
2,2'-ethylidene-bis(4,6-di-tert-butylphenol).

* * * * *